United States Patent
Sharma et al.

(10) Patent No.: US 12,088,737 B2
(45) Date of Patent: Sep. 10, 2024

(54) METHOD TO ESTABLISH AN APPLICATION LEVEL SSL CERTIFICATE HIERARCHY BETWEEN MASTER NODE AND CAPACITY NODES BASED ON HARDWARE LEVEL CERTIFICATE HIERARCHY

(71) Applicant: EMC IP Holding Company LLC, Hopkinton, MA (US)

(72) Inventors: Anurag Sharma, Cedar Park, TX (US); Senthil Ponnuswamy, San Jose, CA (US); Marcelo Daniel Vinante, Georgetown, TX (US); Elie Antoun Jreij, Pflugerville, TX (US)

(73) Assignee: EMC IP HOLDING COMPANY LLC

( * ) Notice: Subject to any disclaimer, the term of this patent is extended or adjusted under 35 U.S.C. 154(b) by 152 days.

(21) Appl. No.: 16/919,526

(22) Filed: Jul. 2, 2020

(65) Prior Publication Data
US 2022/0006654 A1    Jan. 6, 2022

(51) Int. Cl.
*H04L 9/32* (2006.01)
*H04L 9/40* (2022.01)

(52) U.S. Cl.
CPC .......... *H04L 9/3265* (2013.01); *H04L 9/3236* (2013.01); *H04L 9/3247* (2013.01); *H04L 63/0428* (2013.01); *H04L 63/0869* (2013.01); *H04L 63/0876* (2013.01)

(58) Field of Classification Search
CPC ... H04L 9/3265; H04L 9/3236; H04L 9/3247; H04L 63/0428; H04L 63/0869; H04L 63/0876

USPC ........................................................ 713/157
See application file for complete search history.

(56) References Cited

U.S. PATENT DOCUMENTS

| | | | | |
|---|---|---|---|---|
| 6,006,259 A | * | 12/1999 | Adelman | ................ H04L 61/10 709/223 |
| 6,078,957 A | * | 6/2000 | Adelman | ................ H04L 61/00 709/224 |
| 6,636,975 B1 | * | 10/2003 | Khidekel | ............ H04L 63/0861 726/10 |

(Continued)

*Primary Examiner* — Venkat Perungavoor
*Assistant Examiner* — Peiliang Pan
(74) *Attorney, Agent, or Firm* — WOMBLE BOND DICKINSON (US) LLP (57) ABSTRACT

An intelligent method of mutual validation between a cluster manager and a new node, also enabling automatic signing of an application certificate for the new node. A root certificate authority is embedded in a cluster manager at the factory. The certificate includes the cluster manager serial number. Similarly, a certificate is embedded in an appliance to be joined as a new node, the certificate including the appliance's serial number. When requesting to join the cluster, the node sends its certificate to the cluster manager. The cluster manager verifies that the serial number in the certificate matches a serial number in its white list and validates the certificate ownership by the node. Conversely, the cluster manager sends its certificate to the node, so that the node can verify its communicating with a valid cluster manager. The node can then ask the manager to sign its application certificate, and the manager uses its root certificate authority to sign the certificate.

20 Claims, 7 Drawing Sheets

(56) References Cited

U.S. PATENT DOCUMENTS

| | | | | |
|---|---|---|---|---|
| 7,185,364 | B2* | 2/2007 | Knouse | H04L 63/10 713/168 |
| 7,260,716 | B1* | 8/2007 | Srivastava | H04L 9/0827 713/168 |
| 7,272,714 | B2* | 9/2007 | Nagaratnam | H04L 63/0823 713/157 |
| 7,853,782 | B1* | 12/2010 | Geddes | G06Q 20/027 713/153 |
| 8,601,498 | B2* | 12/2013 | Laurich | G06F 21/85 719/326 |
| 9,325,742 | B1* | 4/2016 | Barsness | H04L 63/20 |
| 9,391,966 | B2* | 7/2016 | Clark | H04L 63/08 |
| 9,762,569 | B2* | 9/2017 | Schneider | H04L 9/3265 |
| 9,864,993 | B2* | 1/2018 | Weller | G06Q 20/367 |
| 10,042,993 | B2* | 8/2018 | Beigi | G06F 21/32 |
| 10,338,829 | B2* | 7/2019 | Rao | G06F 3/067 |
| 10,505,984 | B2* | 12/2019 | Yang | H04L 63/166 |
| 10,742,716 | B1* | 8/2020 | Finkelstein | H04L 67/10 |
| 10,749,692 | B2* | 8/2020 | Hojsik | H04L 9/3247 |
| 10,754,813 | B1* | 8/2020 | Sorenson, III | G06F 17/40 |
| 10,855,452 | B2* | 12/2020 | Fu | H04L 9/0825 |
| 10,909,269 | B2* | 2/2021 | Qiu | H04L 9/0825 |
| 10,936,294 | B2* | 3/2021 | Marks | G06F 11/302 |
| 10,958,662 | B1* | 3/2021 | Sole | H04L 63/0853 |
| 11,010,478 | B2* | 5/2021 | Paulraj | G06F 21/575 |
| 11,048,523 | B2* | 6/2021 | Ganesan | G06F 9/45558 |
| 11,068,598 | B2* | 7/2021 | Brown | G06F 21/445 |
| 11,095,445 | B2* | 8/2021 | Gupta | H04L 63/06 |
| 11,134,058 | B1* | 9/2021 | Sole | H04W 12/12 |
| 11,341,230 | B1* | 5/2022 | Ponnuswamy | H04L 63/083 |
| 2003/0191936 | A1* | 10/2003 | Kawatsura | H04L 63/123 705/59 |
| 2005/0268151 | A1* | 12/2005 | Hunt | H04L 43/0811 714/4.1 |
| 2009/0289776 | A1* | 11/2009 | Moore | G06Q 20/352 340/10.41 |
| 2010/0325419 | A1* | 12/2010 | Kanekar | H04L 67/1001 713/151 |
| 2010/0325429 | A1* | 12/2010 | Saha | H04L 9/3268 713/158 |
| 2012/0174196 | A1* | 7/2012 | Bhogavilli | H04L 9/0825 726/22 |
| 2012/0297487 | A1* | 11/2012 | Xia | G06F 21/10 726/26 |
| 2013/0078947 | A1* | 3/2013 | Pecen | H04L 63/1458 455/411 |
| 2013/0176115 | A1* | 7/2013 | Puleston | G06F 13/4282 340/10.51 |
| 2014/0082365 | A1* | 3/2014 | Everhart | H04L 9/3263 713/175 |
| 2015/0130593 | A1* | 5/2015 | Mats | G06K 7/0008 340/10.1 |
| 2016/0048709 | A1* | 2/2016 | Butler | H04L 67/1097 340/10.51 |
| 2016/0321480 | A1* | 11/2016 | Hamlin | G16Z 99/00 |
| 2016/0344717 | A1* | 11/2016 | Matthews | H04L 63/08 |
| 2017/0220282 | A1* | 8/2017 | Dambal | G06F 3/0604 |
| 2018/0007059 | A1* | 1/2018 | Innes | H04L 9/3228 |
| 2018/0196827 | A1* | 7/2018 | Sundaram | G06F 3/0637 |
| 2018/0367521 | A1* | 12/2018 | Daidone | H04L 63/08 |
| 2019/0036711 | A1* | 1/2019 | Qiu | H04L 9/0637 |
| 2019/0373137 | A1* | 12/2019 | Krukar | H04L 9/14 |
| 2020/0120458 | A1* | 4/2020 | Aldana | H04W 4/80 |
| 2020/0162330 | A1* | 5/2020 | Vadapalli | H04L 63/0892 |
| 2020/0314173 | A1* | 10/2020 | Pahwa | G06F 9/5083 |
| 2020/0382375 | A1* | 12/2020 | Yadhav | H04L 41/0893 |
| 2021/0058388 | A1* | 2/2021 | Knotwell | G06F 9/45558 |
| 2021/0135867 | A1* | 5/2021 | Zeng | H04L 9/32 |
| 2021/0136147 | A1* | 5/2021 | Giassa | H04L 67/1051 |
| 2021/0141660 | A1* | 5/2021 | Neginhal | G06F 3/067 |
| 2021/0250415 | A1* | 8/2021 | Danilchenko | H04L 67/104 |
| 2023/0120049 | A1* | 4/2023 | Vangati | H04L 63/0823 709/203 |

* cited by examiner

METHOD TO ESTABLISH AN APPLICATION LEVEL SSL CERTIFICATE HIERARCHY BETWEEN MASTER NODE AND CAPACITY NODES BASED ON HARDWARE LEVEL CERTIFICATE HIERARCHY

TECHNICAL FIELD

This disclosure relates to establishing a certificate hierarchy between Master node and Capacity node(s) based on a single certificate authority.

BACKGROUND

In a computing cluster having multiple nodes, when a new node is to be joined, the user needs to enter secure credentials in order to authenticate the new node. This makes it more cumbersome to add new nodes and is not as secured as an automated authentication process.

The Dell Remote Access Controller (DRAC) is an out-of-band management platform on certain Dell servers. The platform may be integrated into the main board, in which case it is referred to as iDRAC for Integrated Dell Remote Access Controller. DRAC provides a browser-based or command-line interface (or both) for managing and monitoring the server hardware. The controller has its own processor, memory, network connection, and access to the system bus.

The iDRAC includes a web server that is configured to use the industry-standard SSL security protocol to transfer encrypted data over a network. Built upon asymmetric encryption technology, SSL is widely accepted for providing authenticated and encrypted communication between clients and servers to prevent eavesdropping across a network. iDRAC Web server has a Dell self-signed unique SSL digital certificate by default. The iDRAC is also provisioned at the factory with a certificate that is signed by Dell CA. This certificate can be used to verify that this is a genuine Dell device.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

A computing appliance, such as a purpose built appliance containing a cluster of Dell EMC PowerEdge Servers, is comprised of several applications that communicate with each other over HTTPS using SSL certificate for secured communications. To implement SSL, an SSL certificate must be issued by a certificate authority (CA). In the case of the multi-node appliance the objective is to establish a certificate hierarchy between the Master node and the Capacity node(s) based on a single certificate authority configured by the user.

According to disclosed embodiments, the certificate hierarchy is established under the condition that the user should not be required to enter any secret information for adding a new node to the cluster. Moreover, the mechanism should be cryptographically strong and shouldn't be based on any algorithm or vulnerable to man in the middle (MITM) attack.

Disclosed embodiments enable users to setup an appliance level CA that is unique to their environment and is the root CA for all application certificates within the system. It also helps enable automatic periodic certificate rotation in a closed system. This is achieved by leveraging the iDRAC certificates that are embedded on each system and signed by DELL CA. Also, the encryption and decryption are offloaded to iDRAC for proving the possession of private key for iDRAC certificate. In more generic terms, the cluster manager is provided in the factory with a certificate issued by recognized CA, e.g., Dell CA. Once deployed, when a new node seeks to join the cluster, the certificate of the cluster manager is leveraged to establish authentication with the new node.

Overall, the process proceeds as follows. On startup each Host OS/application adds the DELL CA certificate that is embedded in the software to its trust store. The user configures serial number (also referred to as PSNT and generally a 14-digit number) to new node and also adds it to whitelist of the Cluster Manager. The new node sends a request to the Cluster Manager (aka Master Node) to allow it to join the cluster. Both new node and cluster manager extract the serial number from their peer iDRAC server certificate and verify that the serial number is in the whitelist. Both the nodes ensure the iDRAC server certificate is signed by DELL CA by using the trust store. Both new node and cluster manager exchange digital signatures to claim that they have private keys for their server certificate that is embedded in iDRAC. The new node generates certificate for the Host OS/application and requests Cluster Manager to sign it. The cluster manager sends signed certificate to new node and adds the new node to the cluster.

As a result, a secure method is established to identify joining node and establish trust with cluster manager. This method promotes the cluster manager as the certificate signing authority (CA) for all SSL certificates used in the appliance. The method also enables the cluster manager to rotate all SSL certificates periodically to retain certificate level security and it ensures that each cluster gets its own appliance level CA. By implementing the disclosed method, one can avoid insecure methods of programming passwords on the vault system and instead use enhanced certificate based authentication.

Figure 1:
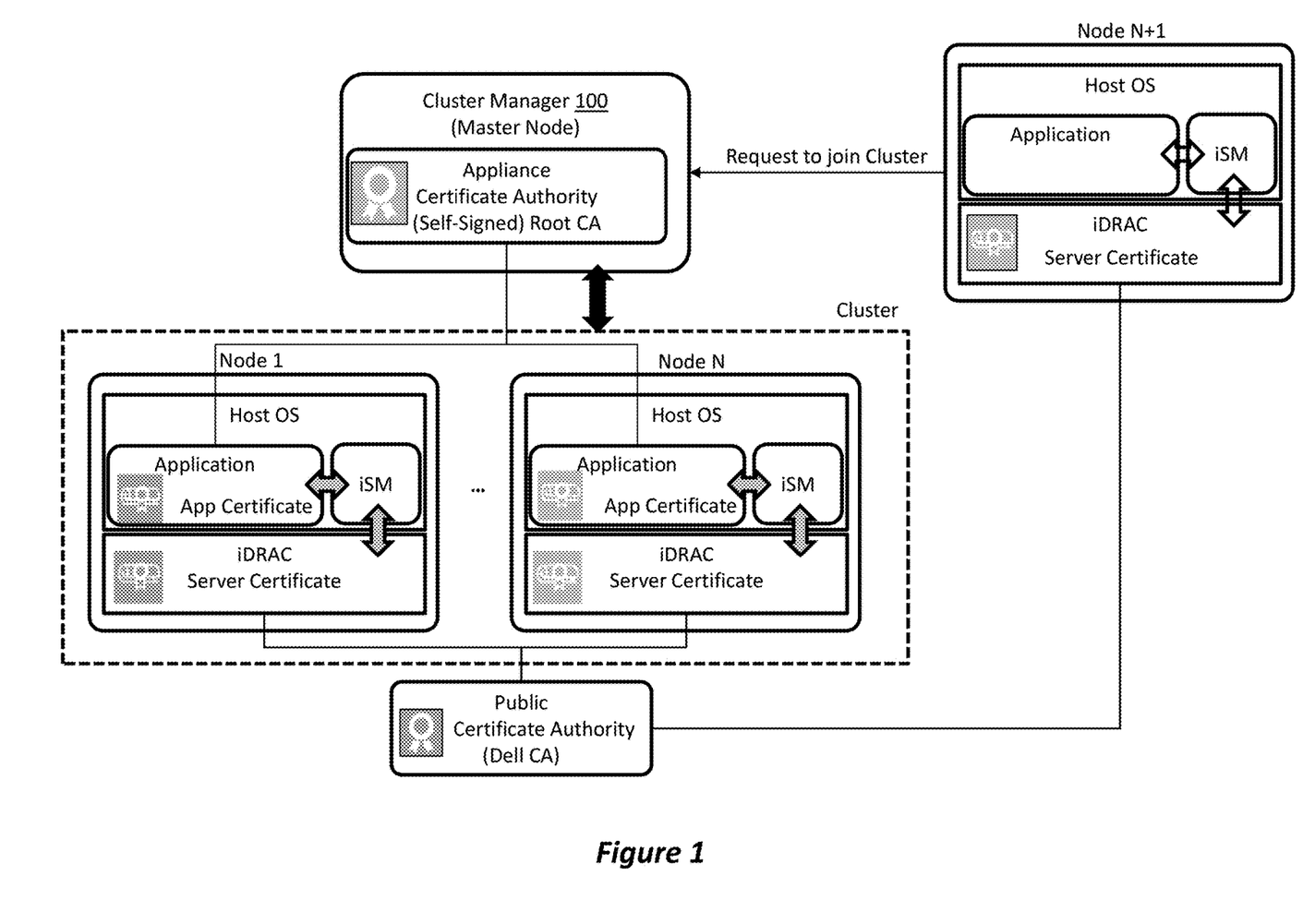
FIG. 1 is a schematic illustrating an example operating environment of a clustered computing system according to one or more embodiments of the disclosure.

FIG. 1 is a general schematic illustrating a computing environment implementing embodiments disclosed herein. Cluster Manager 100 is an application on one of the node in the cluster or a similar node outside of the cluster and acts as the master node. There are N nodes (capacity nodes) in the cluster and a new node, node N+1 is sought to be added to the cluster. As illustrated in FIG. 1, each capacity node has a host OS, an Application (e.g., Data Domain available from Dell EMC of Hopkinton, Massachusetts), with respective app certificates, iDRAC with server certificate, and iDRAC service module (iSM). The iSM complements iDRAC interfaces, e.g., Graphical User Interface (GUI), RACADM CLI, Redfish® and Web Service Management (WSMan), with additional monitoring data. The iSM architecture uses IP socket communication and provides additional systems management data (OS/device driver) to iDRAC and presents one-to-many consoles with access to systems management data through OS standard interfaces.

In the disclosed examples, for security reasons communications with management platform, i.e., iDRAC, can only be via the iSM. This is not a necessary feature, but a feature that when used provides enhanced security. Any of the disclosed embodiments may be implemented using direct communication with the management platform instead, provided that the management platform is provided with a certificate at the factory. Under such condition, an application on a new node can provide its certificate to the cluster manager to be signed by the management platform of the cluster manager based on its CA signed certificate.

In each node, the factory adds a root certificate authority (e.g., Dell CA) certificate in the Host OS certificate trust store and a host identifying certificate signed by Dell CA in the iDRAC certificate store. The certificate includes server identifying attributes such as serial number, service tag, etc. The iDRAC external access is locked, as only the iSM knows the unique random password to communicate with iDRAC over local virtual NIC. The application within the Host OS uses iSM to communicate with iDRAC.

According to an embodiment, the cluster manager 100 is made the root certificate authority (Appliance CA) for appliance nodes. The joining Appliance node N+1 would generate a self-signed certificate while joining the cluster. The cluster manager signs the appliance node certificate after establishing trust. Thereafter, the cluster uses signed certificate for SSL communication between cluster manager 100 and the newly joined appliance node N+1 for API calls. Additionally, the cluster manager 100 may refresh the certificates periodically so as to maintain security.

Figure 2:
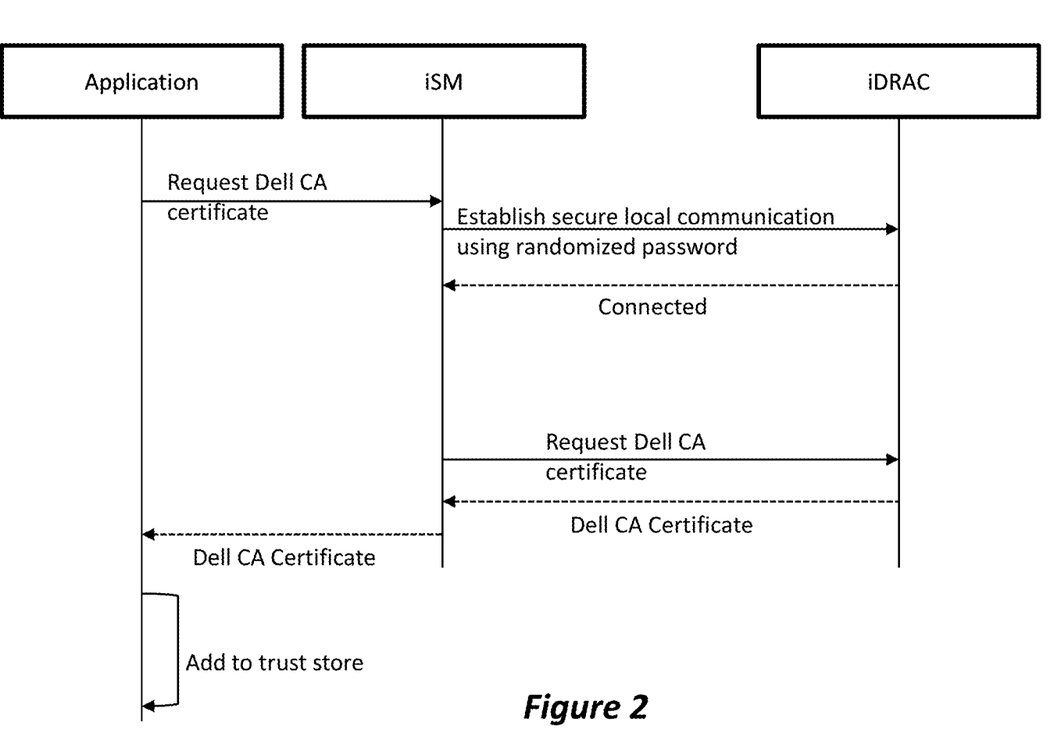
FIG. 2 is a flow diagram illustrating an example of adding certificate in a clustered computing system according to one or more embodiments of the disclosure.

The following provides explanation of embodiment for joining an appliance node onto a cluster, as illustrated in FIG. 2. The steps illustrated in FIG. 2 are executed within the joining node N+1 upon initial power on. The process initiates for each node on startup with the application requesting a certificate from a certificate authority, in this example, a Dell CA. The request is sent to the iSM, upon which the iSM uses host virtual NIC to establish a secure local communication channel with iDRAC using randomized password. This communication path is established in the factory for the new node. Once verified, iDRAC establishes the requested communication channel. The iSM then uses the established communication channel to send the certificate request to iDRAC. The iDRAC then sends the certificate to iSM, which forwards it to the application. The application adds the certificate to the trust store. Generally, the goal of the process of FIG. 2 is to have the certificate saved in the trust store of the new node. Other methods can be utilized to achieve this goal, but this is one non-limiting example.

Figure 3:
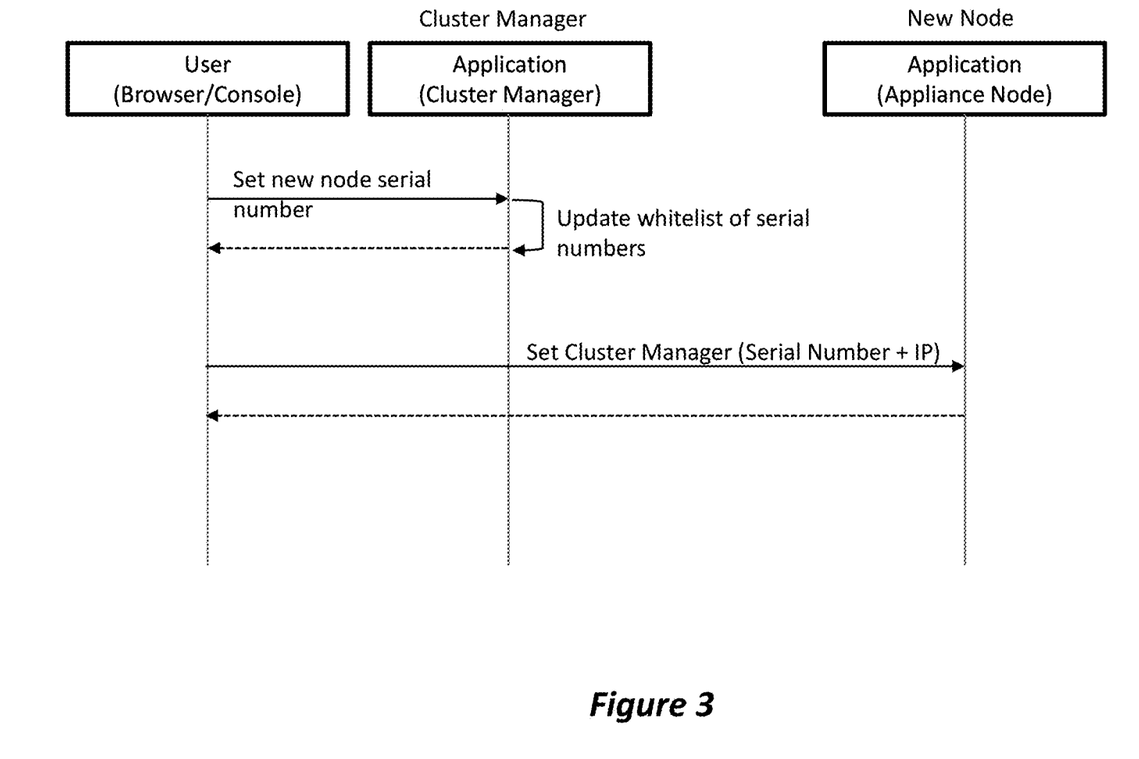
FIG. 3 is a flow diagram illustrating an example of setting credentials according to one or more embodiments of the disclosure.

FIG. 3 illustrates an example where a user sets serial numbers of the new node to enable the new node to join the cluster. Using a browser or a console, the user adds the new node's serial number onto the cluster manager. Note that this serial number must match the serial number that is included on the certificate of the new node, such that the serial number can be verified to be genuine. The cluster manager adds the serial number to its white list of serial numbers and returns an acknowledgement. The user then sets the cluster manager's IP address and serial number on the new node, so that the new node can request to join the cluster. The new node now has the cluster manager's IP address and serial number and can request to join the cluster, while the cluster manager has the new node's serial number on its white list so it can verify the new node. Note that other discovery process may be implemented to enable the new node to discover the cluster manager.

Figure 4:
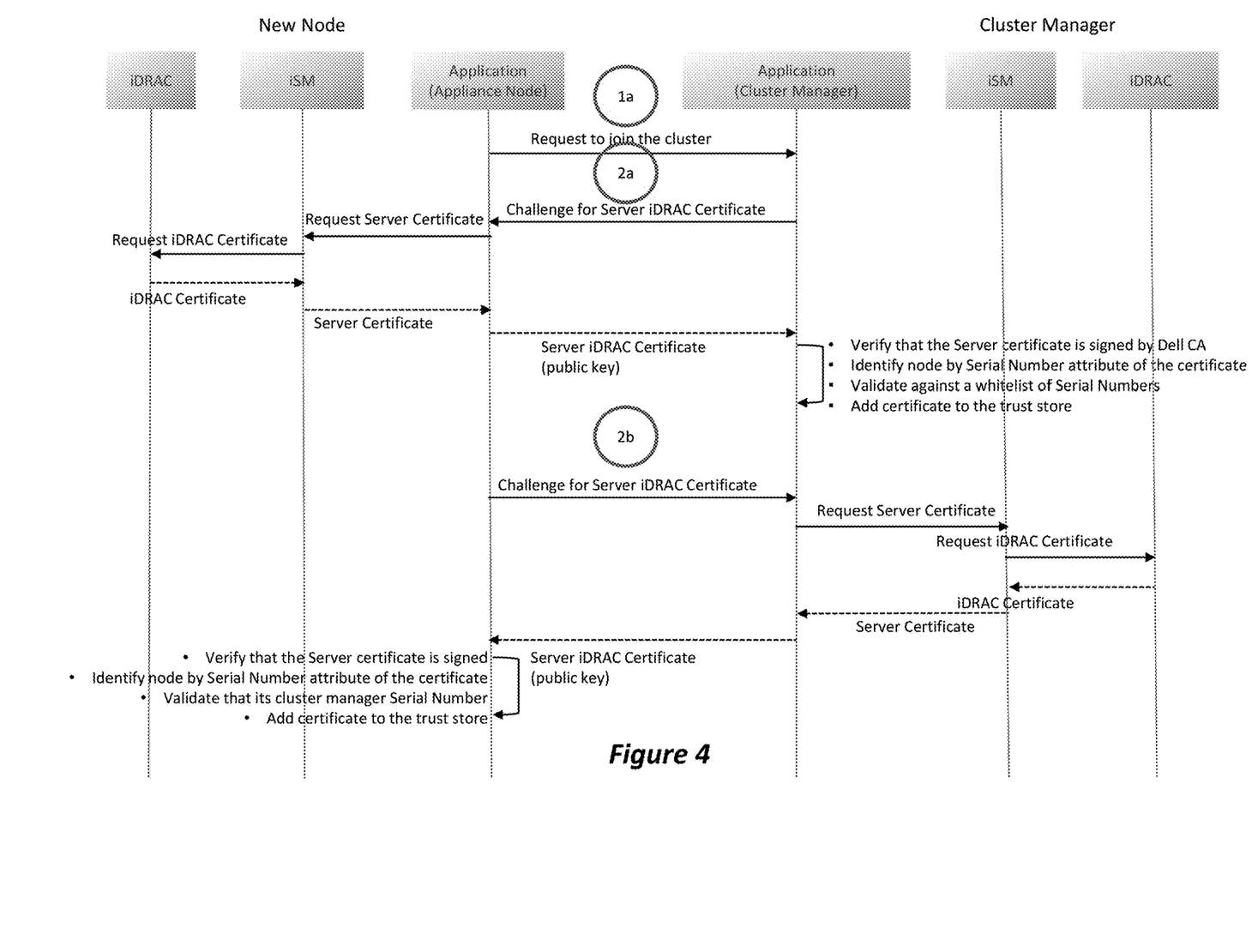
FIG. 4 is a flow diagram illustrating an example server certificate based mutual authentication according to one or more embodiments of the disclosure.

A process for server certificate-based mutual authentication according to an embodiment is illustrated in FIG. 4. The application on the appliance of the new node sends to the application on the cluster manager a request to join the cluster. The application on the cluster manager returns a challenge for server iDRAC certificate. The appliance application then requests a server certificate from the iSM. The iSM sends a request for iDRAC certificate to the iDRAC. The iDRAC forwards the iDRAC certificate to iSM and iSM relays the certificate to the application on the new node. The new node application sends the iDRAC certificate to the cluster manager, together with a public key. The cluster manager then verifies that the certificate is signed by a CA, e.g., Dell CA; it identifies the new node by the serial number attribute of the certificate; it validates the serial number against its white list; and, if all checks, it adds the certificate to the trust store. The cluster manager now authenticated that the new node holds a valid server certificate.

Conversely, the new node application then needs to authenticate that it is communicating with a valid cluster manager, not a man in the middle. The new node application then sends a certificate challenge to the cluster manager. The application on the cluster manager forwards the challenge to the iSM, which sends a iDRAC certificate request to the iDRAC. The iDRAC sends the iDRAC certificate to the iSM, which relays a server certificate to the cluster manager application. The cluster manager sends the iDRAC certificate together with a public key to the new node. The application on the new node then verifies that the certificate is signed by a CA, e.g., Dell CA; it identifies the new node by the serial number attribute of the certificate; it validates the cluster manager serial number against the number programmed (FIG. 3); and, if all checks, it adds the certificate to the trust store. The new node now authenticated that the cluster manager holds a valid server certificate. Thus, a mutual authentication is completed.

In this respect, a method of mutual authentication for joining a new node to the cluster is provided, comprising: adding node serial number of the new node onto white list of the cluster manager; adding IP address and manager serial number of the cluster manager on the new node; authenticating the new node to the cluster manager by: sending a request to join the cluster from the new node to the cluster manager, the request including the node serial number; and, verifying at the cluster manager that the node serial number is listed in the white list and, if so, adding the new node to a cluster manager trust store; authenticating the cluster manager to the new node by: sending from the cluster manager the manager serial number to the new node; and, verifying at the new node that the manager serial number is validated and, if so, adding the cluster manager to a node trust store.

Figure 5:
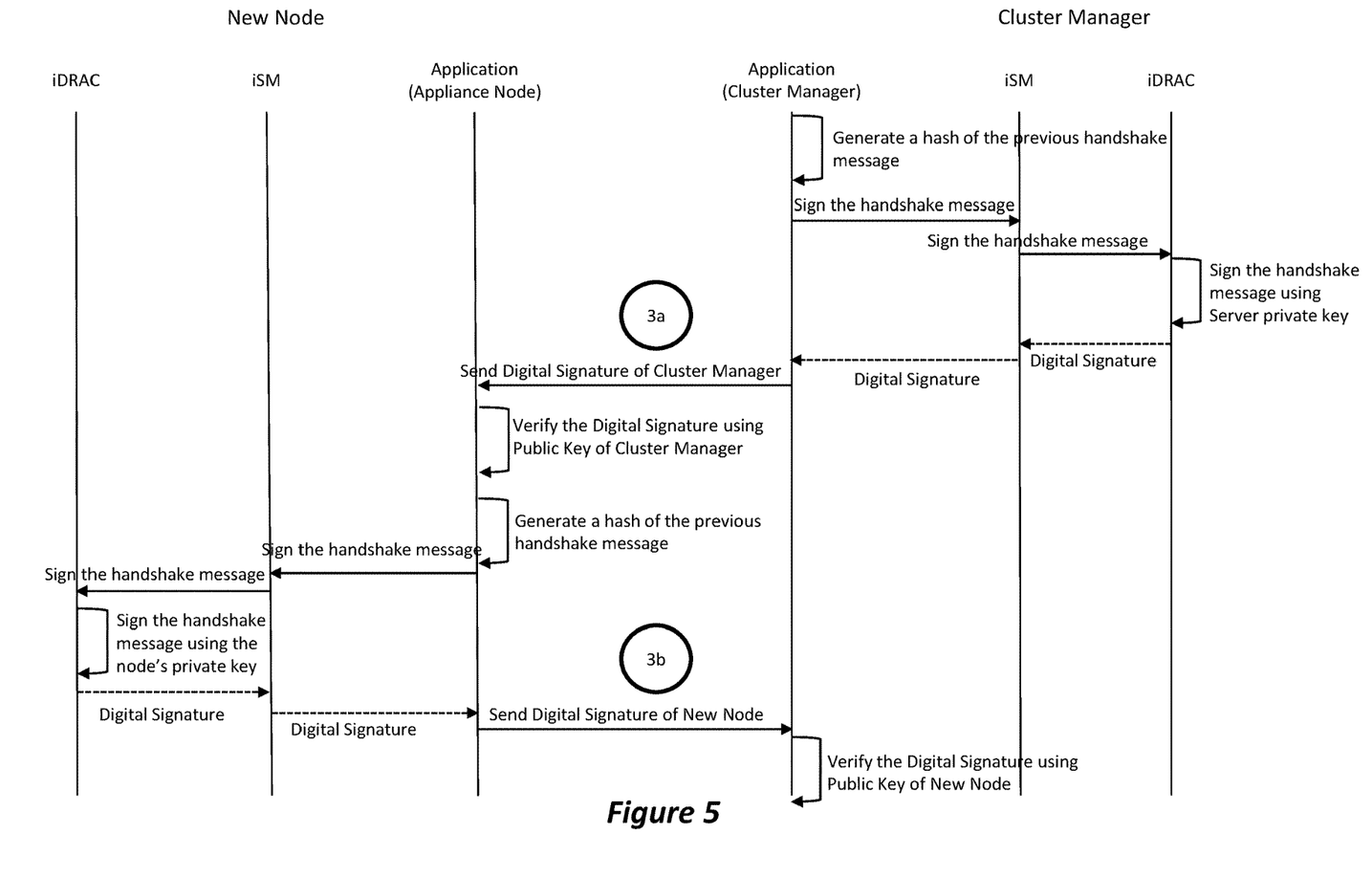
FIG. 5 is a flow diagram illustrating an example of establishing trust between a node and a cluster manager according to one or more embodiments of the disclosure.

FIG. 5 illustrates an embodiment for establishing trust between a node and the cluster manager. In this example the process starts by the cluster manager generating a hash of a previous handshake message. It then sends the hash to the iSM to be signed, and the iSM forwards the hash to iDRAC to be signed. The iDRAC signs the hash using server private key and provides the signature to iSM, which forwards it to the cluster manager application. The cluster manager application sends the signed message to the node. Using the public key of the cluster manager, the node application verifies the digital signature received from the cluster manager. If verified, the node application generates a hash of previous handshake message and asks the iSM to sign the handshake message. The iSM forwards the request to the iDRAC, which uses the node's private key to sign the message, and sends the digital signature to the iSM. The iSM provides the digital signature to the node application, which sends it to the cluster manager. The cluster manager application then verifies the signature using the public key of the new node.

Figure 6:
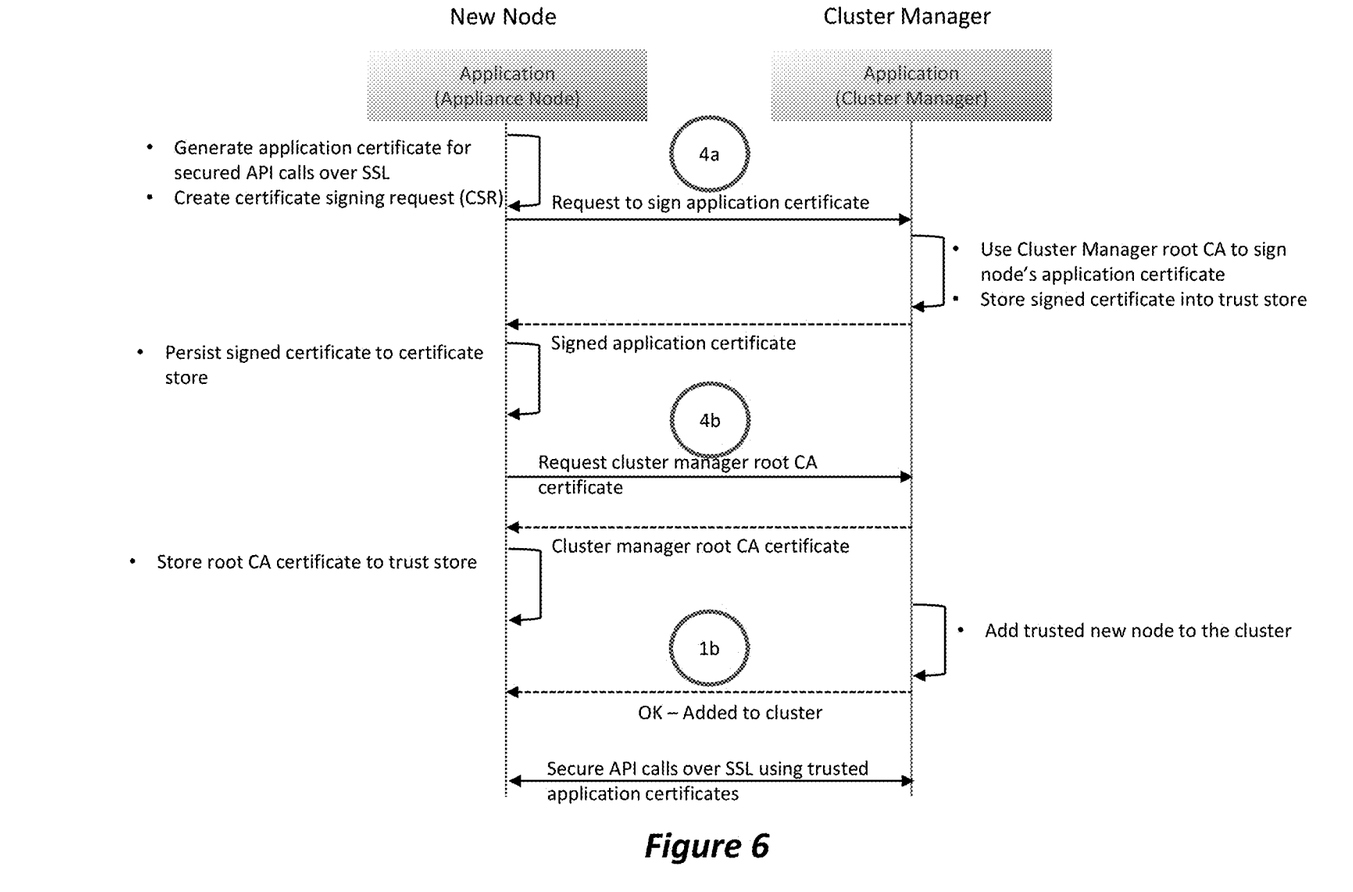
FIG. 6 is a flow diagram illustrating an example of cluster manager signing mode's application certificate according to one or more embodiments of the disclosure.

FIG. 6 illustrates an embodiment for a cluster manager signing a node's application certificate. In this example, the application on the new node generates an application certificate for secured API calls over SSL and creates a certificate signing request (CSR). It then sends to the cluster manager a request to sign the application certificate. Since the cluster manager has validated the new node, it may use it's root certificate to sign the new node's certificate as requested. The cluster manager uses the root CA to sign the node's application certificate and stores the signed certificate into its trust store. Note though, that since the cluster manager has root CA in the trust store and application certificate is signed by root CA, this step is not required. Instead, the cluster manager may keep a copy of the certificate it signs, but the certificates are not stored in trust store. It then sends the signed application certificate to the new node. The new node stores the signed certificate to its certificate store.

Next the new node application requests cluster manager root CA certificate, and the cluster manager returns the cluster manager's root CA certificate. The new node stores the root CA certificate to its trust store. The cluster manager adds the trusted new node to the cluster and sends acknowledgement to the new node. Thereafter, secure API calls can be sent over SSL using trusted application certificates.

As can be seen, according to disclosed examples, a cluster manager can use its root certificate to sign a new node's certificate upon validating the new node. The process includes factory installation of a certificate within each node, wherein the certificate incorporates the ID, e.g., serial number or tag, of the new node. Thus, when a new node sends a request to join a cluster, the cluster manager returns a challenge for the new node's certificate. When the cluster manager receives the new node's certificate, it uses the ID within the certificate to authenticate the new node. Conversely, the new node sends a challenge to the cluster manager for a certificate. The cluster manager sends its certificate and the new node uses the ID embedded within the certificate to authenticate the cluster manager. Thus, a mutual authentication has been performed, wherein the cluster manager verifies that it is communicating with a valid new node, while the new node verifies that it is communicating with a valid cluster manager.

The next step is to establish a secure communication channel between the cluster manager and the new node. The cluster manager generates a hash of prior communication, signs it using its server private key, and sends it to the new node. The new node verifies the hash using its public key of the cluster manager. The new node then generates a hash of prior communication, signs it using its private key and sends it to the cluster manager. Once each side verifies the digital signature using the key, secure communication may commence using SSL.

The application on the new node then sends a request to the cluster manager to sign its certificate. The cluster manager uses its root CA to sign the new node application's certificate and returns the signed certificate to the new node.

Figure 7:
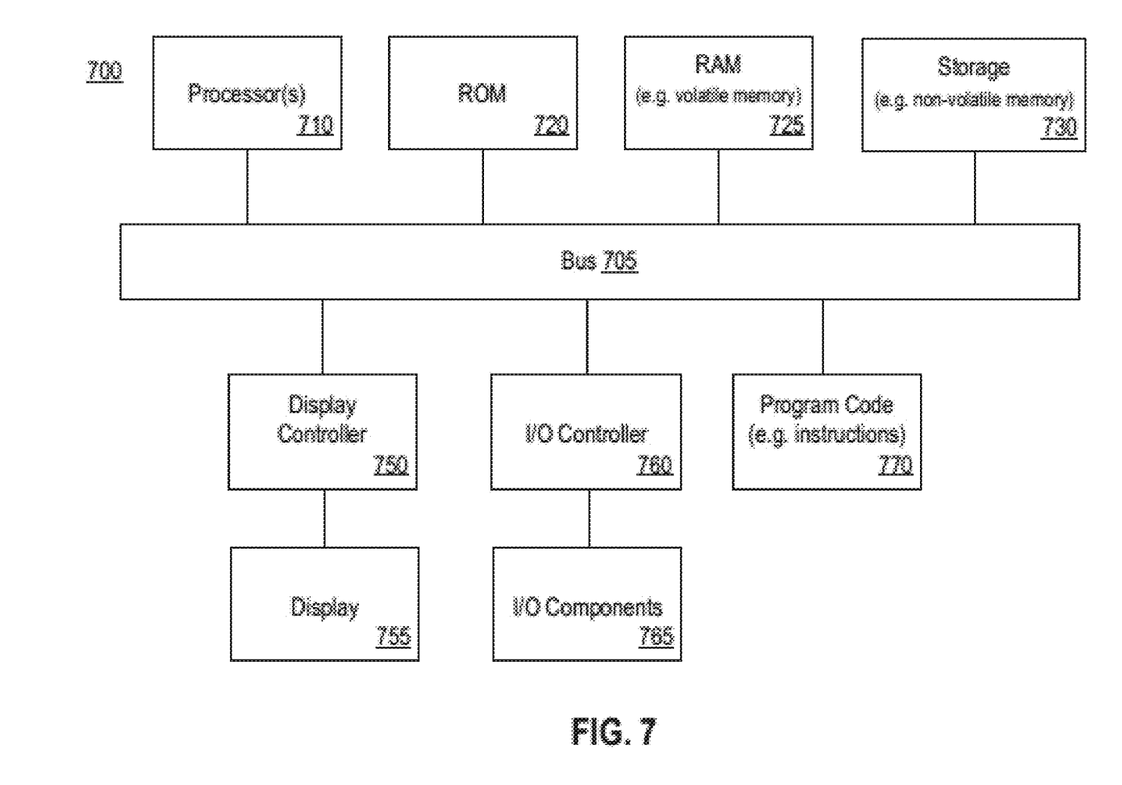
FIG. 7 is a block diagram illustrating an example of a computing system that may be used in conjunction with one or more embodiments of the disclosure.

FIG. 7 shows a block diagram of an example of a computing system that may be used in conjunction with one or more embodiments of the disclosure. For example, computing system 400 (or system, or server, or computing device, or device) may represent any of the devices or systems (e.g. backup component 150, clustered storage system 180, storage node 212, etc.) described herein that perform any of the processes, operations, or methods of the disclosure. Note that while the computing system 700 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 700 may include a bus 705 which may be coupled to a processor 710, ROM (Read Only Memory) 720, RAM (or volatile memory) 725, and storage (or non-volatile memory) 730. The processor(s) 710 may retrieve stored instructions from one or more of the memories 720, 725, and 730 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 710 may perform operations in an on-demand or "cloud computing" environment or as a service (e.g. within a "software as a service" (SaaS) implementation). Accordingly, the performance of operations may be distributed among the one or more processors 710, whether residing only within a single machine or deployed across a number of machines. For example, the one or more processors 710 may be located in a single geographic location (e.g. within a home environment, an office environment, or a server farm), or may be distributed across a number of geographic locations. The RAM 725 may be implemented as, for example, dynamic RAM (DRAM), or other types of memory that require power continually in order to refresh or maintain the data in the memory. Storage 730 may include, for example, magnetic, semiconductor, tape, optical, removable, non-removable, and other types of storage that maintain data even after power is removed from the system. It should be appreciated that storage 730 may be remote from the system (e.g. accessible via a network).

A display controller 750 may be coupled to the bus 705 in order to receive display data to be displayed on a display device 755, which can display any one of the user interface features or embodiments described herein and may be a local or a remote display device. The computing system 700 may also include one or more input/output (I/O) components 765 including mice, keyboards, touch screen, network interfaces, printers, speakers, and other devices. Typically, the input/output components 765 are coupled to the system through an input/output controller 760.

Program code 770 may represent any of the instructions, applications, software, libraries, toolkits, modules, components, engines, units, functions, logic, etc. as described herein (e.g. backup component 150). Program code 770 may reside, completely or at least partially, within the memories described herein (e.g. non-transitory computer-readable media), or within a processor during execution thereof by the computing system. Program code 770 may include both machine code, such as produced by a compiler, and files containing higher-level or intermediate code that may be executed by a computing system or other data processing apparatus (or machine) using an interpreter. In addition, program code 770 can be implemented as software, firmware, or functional circuitry within the computing system, or as combinations thereof. Program code 770 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that the term "approximately" or "substantially" may be used herein and may be interpreted as "as nearly as practicable," "within technical limitations," and the like. In addition, the use of the term "or" indicates an inclusive or (e.g. and/or) unless otherwise specified. Reference to ordinal numbers such as "first," "second," "third," etc. may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. In a computing cluster comprising a cluster manager and a plurality of nodes, each node comprising a management platform, an application, and a host operating system (OS), a method of mutual authentication for joining a new node to the cluster, comprising:
    adding a node serial number of the new node onto a white list of the cluster manager;
    adding an internet protocol (IP) address and a cluster manager serial number of the cluster manager on the new node;
    performing a mutual authentication, comprising:
    authenticating the new node to the cluster manager by:
        sending a request to join the cluster from the new node to the cluster manager, the request including the node serial number from the new node,
        receiving a first challenge for a first server certificate from the cluster manager to the new node, wherein a first application of the new node sends a first server certificate request to a first remote access controller (iDRAC) of the new node through a first service module (SM) of the new node, wherein the first SM sends the first server certificate request to the first iDRAC, wherein the first iDRAC forwards the first server certificate to the first SM, wherein the first iDRAC is external access is locked, as only the first SM has an unique random password to communicate with the first iDRAC, and
        receiving the first server certificate from the first SM,
        sending the first server certificate with a first public key from the new node to the cluster manager; and
        verifying at the cluster manager that the node serial number from the new node is listed in the white list and, upon verification, adding the new node to a cluster manager trust store;
    authenticating the cluster manager to the new node by:
        receiving a second challenge for a second server certificate from the new node to the cluster manager, wherein a second application of the cluster manager sends the second server certificate request to a second iDRAC through a second SM of the cluster manager, wherein the second SM sends the second server certificate request to the second iDRAC of the cluster manager, wherein the second iDRAC forwards the second server certificate to the second SM, wherein the second iDRAC external access is locked, as only the second SM has an unique random password to communicate with the second iDRAC,
        receiving the second server certificate from the second SM, and
        sending from the cluster manager the second server certificate with a second public key and the cluster manager serial number to the new node, and verifying at the new node that the cluster manager serial number sent from the cluster manager matches the cluster manager serial number added with the IP address on the new node, and, upon verification, adding the cluster manager to a node trust store.

2. The method of claim 1, wherein sending a request to join the cluster comprises sending a node certificate embedded in the new node, wherein the node certificate includes the node serial number and wherein the node certificate is from the remote access controller upon request.

3. The method of claim 2, wherein sending from the cluster manager the cluster manager serial number comprises sending a server certificate including the cluster manager serial number, wherein the server certificate is from the remote access controller upon request.

4. The method of claim 3, further comprising establishing secure communication between the new node and the cluster manager.

5. The method of claim 4, wherein establishing secure communication comprises the steps of:
  a. generating a manager hash at the cluster manager and signing the manager hash using a manager private key into a cluster manager digital signature;
  b. sending the cluster manager digital signature to the new node and at the new node verifying the cluster manager digital signature using a manager public key;
  c. generating a node hash at the new node and signing the node hash using a node private key into a new node digital signature;
  d. sending the new node digital signature to the cluster manager and at the cluster manager verifying the new node digital signature using a node public key.

6. The method of claim 5, further comprising sending a request to the cluster manager to sign application certificate.

7. The method of claim 6, wherein sending the request comprises the steps of:
  a. generating application certificate at the new node;
  b. creating a certificate signing request;
  c. sending the certificate signing request to the cluster manager;
  d. using a root certificate authority of the cluster manager to sign the application certificate.

8. The method of claim 7, further comprising sending a request for cluster manager's root certificate authority certificate and adding the root certificate authority certificate to a trust store of the new node.

9. The method of claim 8, further comprising adding the new node to the cluster after signing the application certificate.

10. A system comprising:
a computing cluster having one or more processors and a cluster manager; and
a non-transitory computer readable medium storing a plurality of instructions, which when executed, cause the one or more processors to:
perform a mutual authentication, comprising:
receive a request from a new node to join the computing cluster;
send a first challenge for a first server certificate to the new node, wherein a first application of the new node sends a first server certificate request to a first remote access controller (iDRAC) of the new node through a first service module (SM) of the new node, wherein the first SM sends the first server certificate request to the first iDRAC, wherein the first iDRAC forwards the first server certificate to the first SM, wherein the first application of the new node receives the first server certificate from the first SM,
receive the first server certificate with a first public key from the new node to the cluster manager
verify that a new node identifier (ID) sent by the new node matches an ID stored in a white list of the cluster manager, wherein the new node ID comprises a node serial number;
when the new node ID match the ID stored in the white list, add the new node to a trust store of the cluster manager;
receive a second challenge for a second server certificate from the new node;
send a request for the second server certificate to a second iDRAC through a second SM, wherein the second SM sends the second server certificate request to the second iDRAC, wherein the second iDRAC forwards the second certificate to the second SM, wherein the second RAC iDRAC is external access is locked, as only the second SM has an unique random password to communicate with the second iDRAC;
receive the second server certificate from the second SM;
send the second server certificate with a second public key to the new node.

11. The system of claim 10, wherein the cluster manager comprises an embedded certificate of root certificate authority.

12. The system of claim 11, wherein the plurality of instructions, when executed, further cause the one or more processors to execute the steps:
  a. after receiving the request, sending to the new node a challenge for a certificate; and,
  b. receiving in response a node certificate which includes the node serial number of the new node.

13. The system of claim 12, wherein the plurality of instructions, when executed, further cause the one or more processors to:
generate a hash of a prior handshake message;
sign the hash of the prior handshake message using a cluster manager private key into a manager digital signature; and,
send the manager digital signature to the new node.

14. The system of claim 13, wherein the plurality of instructions, when executed, further cause the one or more processors to:
receive a node digital signature from the new node; and,
verify the node digital signature using public key of the cluster manager sent to the new node.

15. The system of claim 11, wherein the plurality of instructions, when executed, further cause the one or more processors to:
  a. receive from the new node a request to sign application certificate;
  b. use the root certificate authority to sign the application certificate; and,
  c. send signed application certificate to the new node.

16. The system of claim 15, wherein the plurality of instructions, when executed, further cause the one or more processors to: add the new node to the computing cluster.

17. A computer program product comprising a non-transitory computer-readable medium having a computer-readable program code embodied therein to be executed by one or more processors, the program code operating in a computing cluster and including instructions to:
performing a mutual authentication, comprising:
authenticating a new node to a cluster manager by:

sending a request to join the computing cluster from the new node to the cluster manager, the request including a node serial number, receiving a first challenge for a first server certificate from the cluster manager to the new node, wherein a first application of the new node sends a first server certificate request to a first remote access controller (iDRAC) of the new node through a first service module (SM) of the new node, wherein the first SM sends the first server certificate request to the first iDRAC, wherein the first iDRAC forwards the first server certificate to the first SM, wherein the first iDRAC is external access is locked, as only the first SM has an unique random password to communicate with the first iDRAC, and receiving the first server certificate from the first SM;

sending the first server certificate with a first public key from the new node to the cluster manager; and verifying at the cluster manager that the node serial number from the new node is listed in a white list of the cluster manager and, upon verification, adding the new node to a cluster manager trust store;

authenticating the cluster manager to the new node by:

receiving a second challenge for a second server certificate from the new node to the cluster manager, wherein a second application of the cluster manager sends the second server certificate request to a second iDRAC through a second SM of the cluster manager, wherein the second SM sends the second server certificate request to the second iDRAC of the cluster manager, wherein the second iDRAC forwards the second certificate to the second SM, wherein the second iDRAC external access is locked, as only the second SM has an unique random password to communicate with the second iDRAC, receiving the second server certificate from the second SM, and sending from the cluster manager the second server certificate with a second public key and a cluster manager serial number to the new node, and verifying at the new node that the cluster manager serial number sent from the cluster manager matches the cluster manager serial number added with an IP address, and, upon verification, adding the cluster manager to a node trust store.

18. The computer program product of claim 17, wherein the program code includes further instructions to send a node certificate embedded in the new node, wherein the node certificate includes the node serial number.

19. The computer program product of claim 18, wherein the program code includes further instructions to send from the cluster manager a server certificate including the cluster manager serial number.

20. The computer program product of claim 19, wherein the program code includes further instructions to establishing secure communication by the steps of:

a. generating a manager hash at the cluster manager and signing the manager hash using a manager private key into a cluster manager digital signature;

b. sending the cluster manager digital signature to the new node and at the new node verifying the signed manager hash using a manager public key;

c. generating a node hash at the new node and signing the node hash using a node private key into a new node digital signature; and, d. sending the new node digital signature to the cluster manager and at the cluster manager verifying the new node digital signature using a node public key.

* * * * *

UNITED STATES PATENT AND TRADEMARK OFFICE
CERTIFICATE OF CORRECTION

| | | |
|---|---|---|
| PATENT NO. | : 12,088,737 B2 | Page 1 of 1 |
| APPLICATION NO. | : 16/919526 | |
| DATED | : September 10, 2024 | |
| INVENTOR(S) | : Anurag Sharma et al. | |

It is certified that error appears in the above-identified patent and that said Letters Patent is hereby corrected as shown below:

In the Claims

In Column 8, Claim 1, Line 40, delete "iDRAC is external access is locked" and insert --iDRAC external access is locked--.

In Column 10, Claim 10, Line 20, delete "RAC iDRAC is external access" and insert --iDRAC external access--.

Signed and Sealed this
Twentieth Day of May, 2025

Coke Morgan Stewart
*Acting Director of the United States Patent and Trademark Office*